United States Patent [19]
Clayton

[11] 3,837,219
[45] Sept. 24, 1974

[54] VARIABLE INERTIA FLYWHEEL APPARATUS

[75] Inventor: William Clayton, El Monte, Calif.

[73] Assignee: Clayton Manufacturing Company, Los Angeles, Calif.

[22] Filed: Dec. 30, 1969

[21] Appl. No.: 889,180

[52] U.S. Cl. .............................................. 73/117
[51] Int. Cl. ............................................ G01l 5/13
[58] Field of Search ............. 73/117; 74/217, 217 S, 74/218

[56] References Cited
UNITED STATES PATENTS

| | | | |
|---|---|---|---|
| 858,336 | 6/1907 | Foley | 74/218 |
| 3,216,266 | 11/1965 | Sunnen | 74/217 |
| 3,289,471 | 12/1966 | Maxwell | 73/117 |
| 3,491,587 | 1/1970 | Morris et al. | 73/117 |

*Primary Examiner*—Jerry W. Myracle

[57] ABSTRACT

Variable inertia flywheel apparatus for use with a chassis dynamometer, during vehicle engine exhaust gas emission measurements. The apparatus simulates the effect of vehicle roadway-inertia loads on the engine during acceleration and deceleration, while the vehicle is being operated on the dynamometer. A wide range of inertia loads are simulated by three flywheels, each having a different mass; two of the flywheels are each driven from a main shaft, connected with a dynamometer roll, at two different speed ratios, and the third flywheel is driven from the same main shaft at three different speed ratios. More specifically, the flywheels are driven by sheaves and separate sets of belts that can be independently and selectively tensioned to drive one or more of the flywheels at a speed ratio relative to the speed of the dynamometer rolls so as to simulate the corresponding inertia loads. The third flywheel, which normally is in use at all times during a test, is designed to compensate for the inertia load of the particular power absorption unit, dynamometer rolls, drive belts, etc., with which the apparatus is used. Inertia load increments of 250 pounds can be simulated for testing vehicles weighing between about 1,500 pounds through 3,000 pounds, and 500 pound inertia load increments can be simulated for vehicles weighing between about 3,000 and 5,500 pounds. The flywheels are driven by sets of belts tensioned by idlers carried by shift plates operated by control levers that can be individually and selectively shifted to provide the 1,500 to 5,500 pound vehicle weight range of inertia loads, as well as a no-inertia load condition.

7 Claims, 13 Drawing Figures

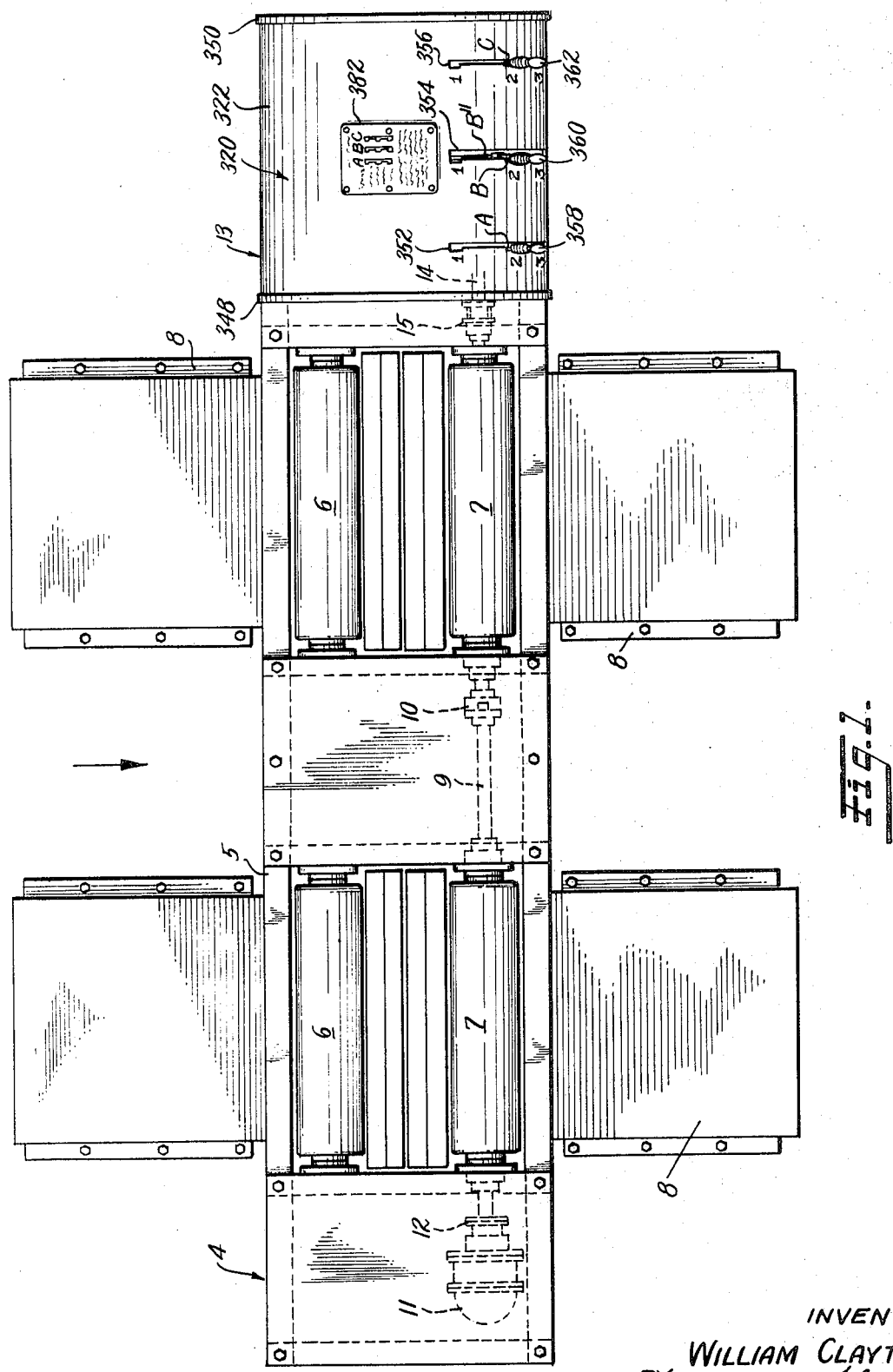

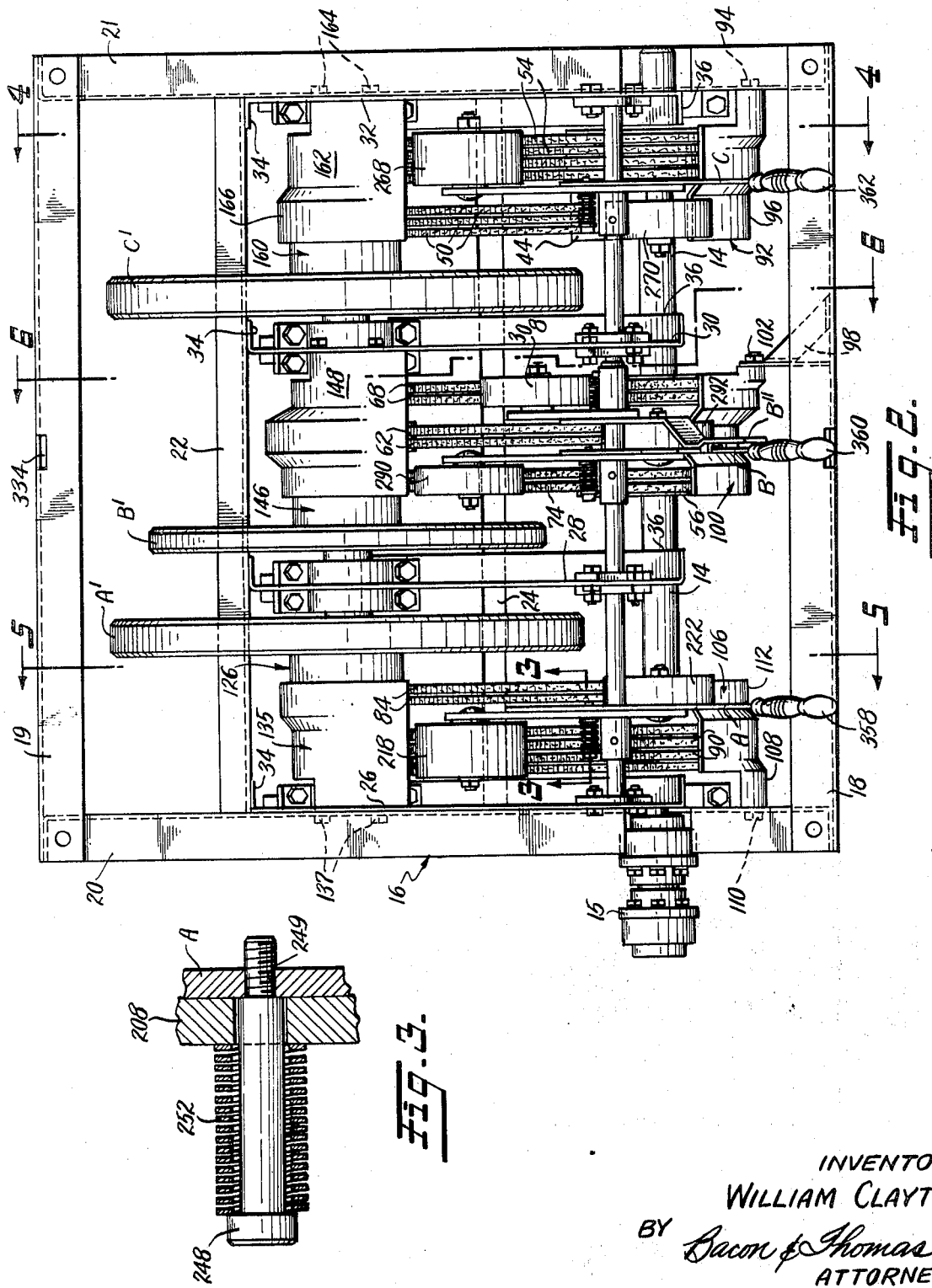

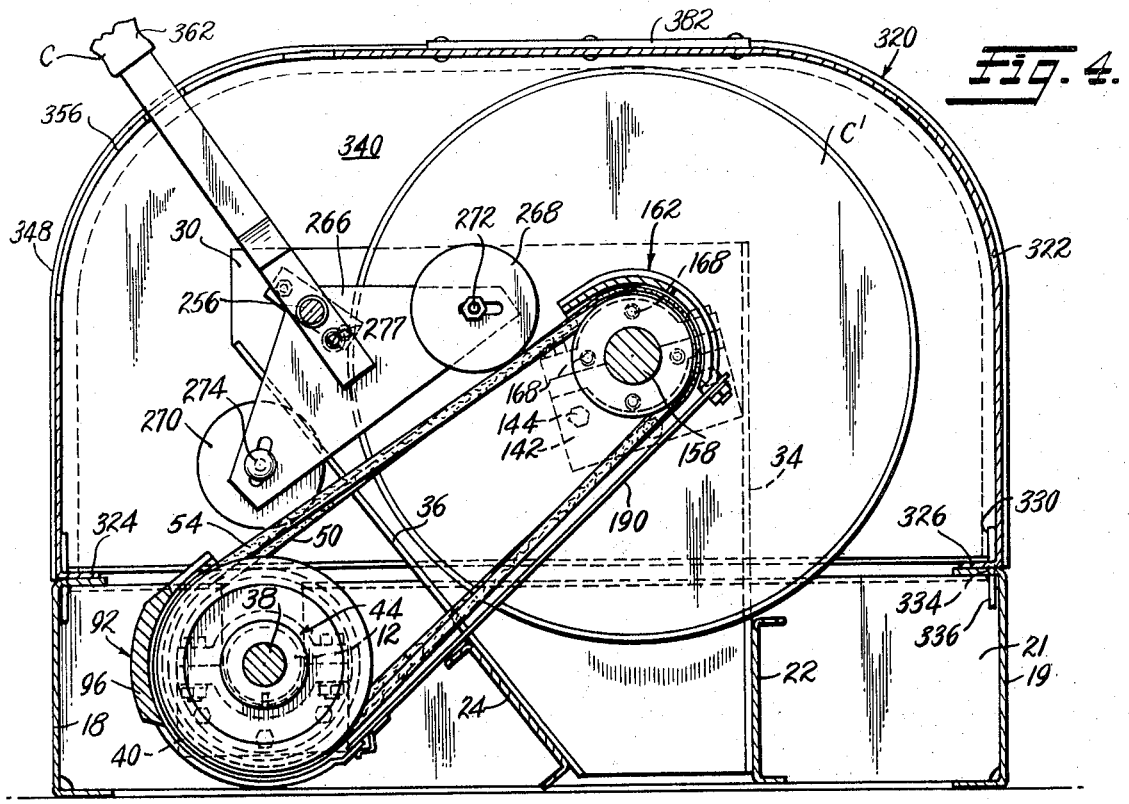
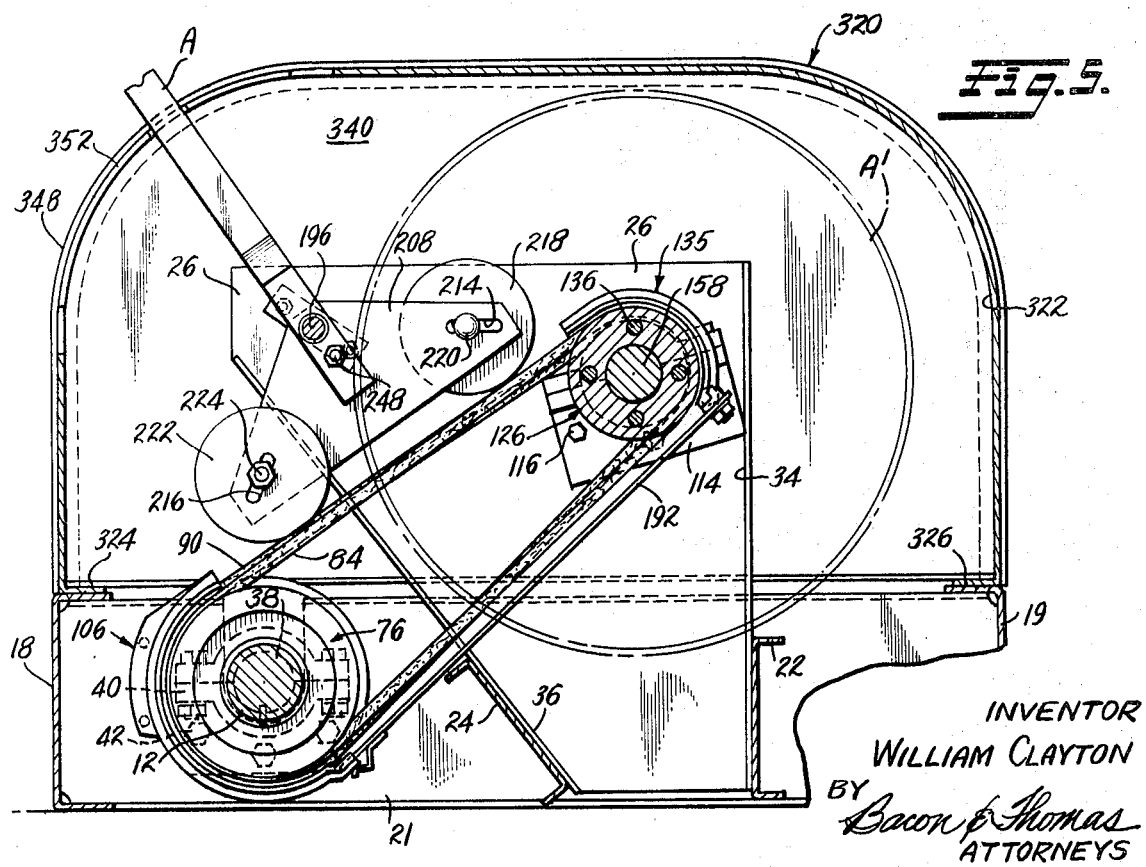

PATENTED SEP 24 1974 3,837,219

INVENTOR
WILLIAM CLAYTON
BY Bacon & Thomas
ATTORNEYS

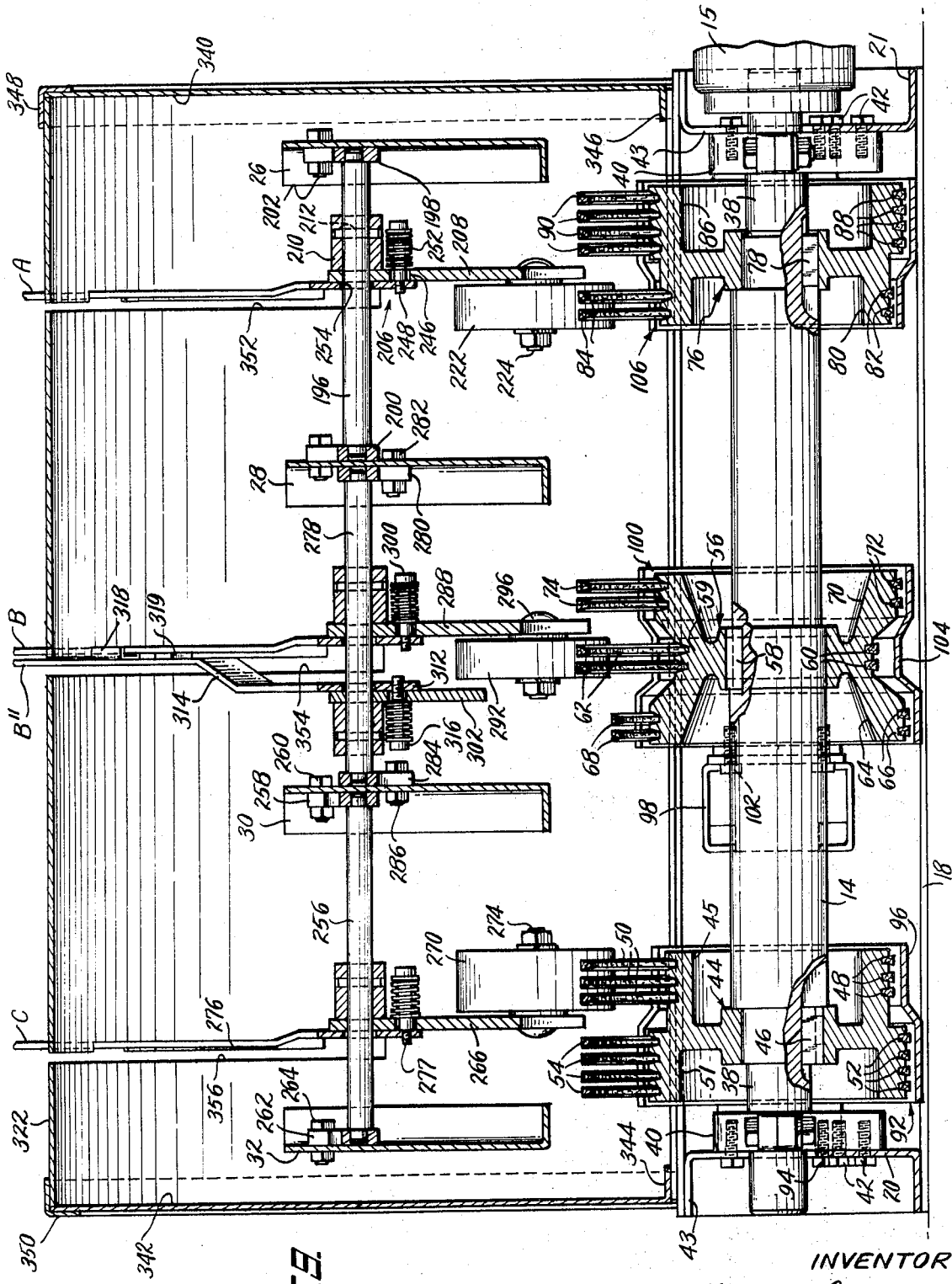

INVENTOR
WILLIAM CLAYTON
BY Bacon & Thomas
ATTORNEYS

VARIABLE INERTIA FLYWHEEL APPARATUS

BACKGROUND OF THE INVENTION

1. FIELD OF THE INVENTION

The present invention relates to apparatus for use with chassis dynamometers to duplicate the inertia effect of a vehicle on its engine during acceleration and deceleration conditions of operation, and which is particularly useful while conducting exhaust gas emission tests, and at which time the vehicle is positioned on the dynamometer rolls and run through a series of acceleration and deceleration tests simulating various roadway operating conditions.

2. THE PRIOR ART

In the past, various vehicle inertia load effects have been obtained by using as many as four mechanically declutchable flywheels with a chassis dynamometer. These satisfied a vehicle weight range where 500 pound inertia load increments were acceptable. However, in connection with the testing of light weight cars, such as small passenger vehicles, particularly of foreign manufacture and some small American cars, it has been found that in order to obtain meaningful results, testing should be made in increments of less than 500 pounds inertia load, particularly with vehicles weighing 1,500 to 3,000 pounds. In this low weight range, it is desirable to be able to simulate inertia loads within 250 pounds of the vehicle weight; but, in order to accomplish this with prior techniques, seven declutchable flywheels would be required, which is impractical and cumbersome because of the complications involved in multi-flywheel selection to reasonably closely match maximum inertia loads of light weight vehicles, to say nothing of the excessive costs and great space requirements that would be involved.

The foregoing problems have been overcome by the present variable inertia flywheel system, which requires only three flywheels driven at different speed ratios relative to the speed of the dynamometer rolls, and capable of providing the 12 needed inertia loads to meet the desired inertia load increments when testing vehicles weighing 1,500 to 5,500 pounds.

SUMMARY OF THE INVENTION

In conformity with the present national effort to control air pollution, and particularly air pollution by one of its principle causes —vehicle exhaust gas, certain standards have been set for exhaust gas emission tests, which must be met by auto manufacturers and others in order to obtain vehicle acceptance or approval by the agencies involved.

Since the maximum air pollution from vehicle engine exhaust gases occurs during acceleration and deceleration, exhaust gas tests have been prescribed for various speed ranges and rates of acceleration and deceleration, and during which operations the exhaust gas is sampled and analyzed for its unburned hydrocarbon content and other constituents to determine the engine efficiency and the effectiveness of anti-air polution device associated therewith.

For present purposes, it is not necessary to discuss all tests and factors involved, but only to refer briefly to those related to the functions of the present invention, which concerns simulating the inertia loads imposed on the engines of vehicles of different weights, during acceleration and deceleration of the vehicles.

For example, a so-called 7-mode cycle of operation has been prescribed for exhaust gas emission measurements requiring use of a dynamometer equipped with a power absorption unit and flywheels. The 7-mode cycle includes an exhaust gas emission test requiring accelerating the vehicle from zero speed to 25 mph at a constant acceleration rate of 2.2 mph per sec., covering a period of about 11½ sec. A further test is to be made during acceleration of the vehicle from 25 mph to 30 mph at the same constant rate, requiring an additional 2½ sec.

A "cruise" test may next be made at a constant speed of 30 mph for 15 sec. followed by a deceleration test from 30 mph to 15 mph at a constant rate of 1.4 mph/sec. covering a period of 11 sec.

A "cruise" test at a constant speed of 15 mph may then be made for 15 sec. Acceleration tests are next made from 15 mph to 30 mph and from 30 mph to 50 mph at a constant rate of 1.2 mph/sec., covering a total of 20 sec. This is followed by a deceleration test from 50 mph to 20 mph at a constant rate of 1.2 mph/sec., consuming 25 sec. The deceleration is continued from 20 mph to zero mph at a constant rate of 2.5 mph/sec., requiring 8 sec. The present apparatus is capable of achieving acceleration and deceleration rates of 3.3 mph/sec., which is one and one-half times the peak acceleration rate of the 7-mode cycle.

If the vehicle decelerates more rapidly than required with no braking, the deceleration should be effected at the desired constant rate by operating the brake pedal.

The variable inertia flywheel apparatus of the present invention is designed to simulate the inertia loads of a motor vehicle comparable to those that occur on the highway, but while the vehicle is stationary on the dynamometer. In this manner, the vehicle can be tested under substantially the same conditions of inertia imposed on the vehicle engine as when it is being driven over the highway.

As is well known, present day vehicles, and particularly passenger vehicles, vary greatly in weight from about 1,500 pounds to 5,500 pounds; and in order to closely simulate the inertia loads of vehicle weights over such wide range, more versatile apparatus is required than has heretofore been available, especially for vehicles under 3,000 pounds. For example, with vehicles weighing up to 1,625 pounds, the apparatus should be capable of providing an equivalent inertia weight of 1,500 pounds. For vehicles weighing 1,625 to 1,875 pounds the apparatus should provide equivalent inertia weight of 1,750 pounds and so on in increments of 250 pounds up to 3,000 pounds. In the weight range of 3,000 to 5,500 pounds, adequate equivalent inertia weights can be provided in increments of 500 pounds. The present apparatus meets all such requirements.

More specifically, the present invention relates to a variable inertia flywheel apparatus for use with a conventional chassis dynamometer, and comprises a frame having three fly-wheels of different mass rotatably mounted thereon. The dynamometer rolls are 8⅝ inches in diameter and the present flywheels are specially designed for use with rolls of such diameter, as will appear more fully hereinafter. Two of the flywheels can each be driven at two different selective speeds by two different sets of belts; and the third flywheel, which is disposed intermediate the other two flywheels, can be driven at three different selective speeds by three sets of belts. As is well known, the inertia of a given flywheel mass varies as the square of its speed, so that wide changes in inertia can be obtained with relatively small changes in speed. The desired inertia load is obtained with the present apparatus by adjusting one or more selected operating levers to engage one or more idlers with respective sets of belts to tension the same.

In the present device, and by way of example and not limitation, the intermediate flywheel is designed to provide a built-in inertia equivalent to 350 pounds, to compensate for the inertia of the power absorption unit, nd dynamometer rolls of one form of chassis dynamometer; and for the flywheel drive means including pulleys, belts, etc. To obtain the proper total inertia load the intermediate flywheel must be in use at all times, since it has an actual inertia effect of 350 pounds less than any given inertia load to be simulated. This compensation cannot be spread over more than one flywheel since one to three flywheels may be in use at the same time. Obviously, if each flywheel were corrected by one-third of the inherent inertia weight of the apparatus when using two flywheels, for example, only two-thirds of the proper compensating correction would be made.

Provision is also made for relieving the tension on all belts, so that no flywheel inertia effect is produced, which is desirable in conducting certain tests.

More particularly, the present apparatus includes a main drive shaft having three stepped sheaves fixed thereto and with which the foregoing sets of belts are associated. Each of the flywheels has a correspondingly stepped sheave attached thereto for cooperation with its associated sets of belts. Each sheave and its flywheel is freely rotatable on a shaft section that is independent of similar shaft sections supporting the remaining flywheels. An operating lever is associated with each flywheel and is connected to a shift plate carrying two idler pulleys, each engageable with a separate set of belts for tensioning the same and effecting driving of a selected flywheel at one of two selective speed ratios to provide a desired inertia value. An auxiliary operating lever and auxiliary shift plate is associated with the intermediate flywheel that is selectively driven by one of the three sets of belts. The auxiliary shift plate carries one idler for tensioning the third set of belts for driving the intermediate flywheel to produce its maximum inertia effect.

The auxiliary lever carries means for locking it to the main lever associated with the same intermediate flywheel, so that both levers normally assume the same angular position. However, the auxiliary lever can be operated independently, and when all other operating levers are in neutral position, the auxiliary lever can be positioned to relieve the tension on the set of belts associated therewith, whereby all inertia effect will be discontinued and none of the flywheels will be rotated. Such condition is desirable when the vehicle is to be tested on the dynamometer at speeds in excess of 65 mph, or in performing other tests where simulated vehicle inertia is not a factor.

In conformity with the above, the principal object of the invention is to provide variable inertia flywheel apparatus for use with a chassis dynamometer to simulate vehicle inertia effects of acceleration and deceleration during exhaust gas emission measurements.

Another object is to provide variable inertia flywheel apparatus for use with a dynamometer that is capable of providing ranges of low and relatively high incremental values of inertia loads to simulate the acceleration and deceleration inertia effects of light weight as well as heavy vehicles.

Another object is to provide a variable inertia flywheel apparatus for use with a dynamometer that can be quickly adjusted to simulate desired inertia loads in accordance with the weight of a given vehicle, and to also provide a no-load inertia condition.

A further object is to provide a variable inertia flywheel apparatus for use with a dynamometer that can be preset in accordance with the vehicle weight, and which will automatically vary the inertia load on the vehicle engine in accordance with the increase or decrease in the speed of the vehicle.

A further object is to provide a variable inertia flywheel apparatus for use with a dynamometer that can be preset in selected low increments to enable simulation of inertia load conditions in values corresponding to those of small or compact passenger vehicles when accelerating or decelerating at various rates on a roadway.

Another object of the invention is to provide variable inertia flywheel apparatus for use with a dynamometer comprising one or more flywheels, and wherein each flywheel can be selectively and independently driven at one or more selective speed ratios relative to the speed of the dynamometer rolls.

Still another object is to provide variable inertia flywheel apparatus for use with a dynamometer comprising three flywheels of different mass, and wherein each flywheel can be independently actuated to provide at least two different ratios of inertia load effects.

A still further object is to provide variable inertia flywheel apparatus for use with a dynamometer which is capable of simulating inertia loads corresponding to vehicle weights over the range of 1,500 to 5,500 pounds and which can be preset for 250 pound increments for vehicles weighing between about 1,500 pounds to about 3,000 pounds, and for 500 pound increments for vehicles weighing about 3,000 pounds to about 5,500 pounds.

A still further object is to provide variable inertia flywheel apparatus that is easy to use and which can be economically produced.

Other objects and advantages of the invention will be apparent from the following description taken in conjunction with the accompanying drawings.

DESCRIPTION OF THE DRAWINGS

FIG. 1 is a plan view of a known type of chassis dynamometer having the present variable inertia flywheel device associated therewith;

FIG. 2 is an enlarged plan view of the variable inertia flywheel device with its cover removed;

FIG. 3 is an enlarged fragmentary vertical sectional view, taken on the line 3—3 of FIG. 2, showing the mounting means for one of the belt tightening levers;

FIG. 4 is a transverse vertical sectional view taken on the line 4—4 of FIG. 2, but showing the cover in place;

FIG. 5 is a transverse vertical sectional view, similar to FIG. 4, taken on the line 5—5 of FIG. 2;

FIG. 9 is an enlarged vertical sectional view, taken on the line 9—9 of FIG. 6, showing the pulley sheave assemblies for driving the respective flywheels, all mounted on the drive shaft;

DESCRIPTION OF THE PREFERRED EMBODIMENT

Figure 6:
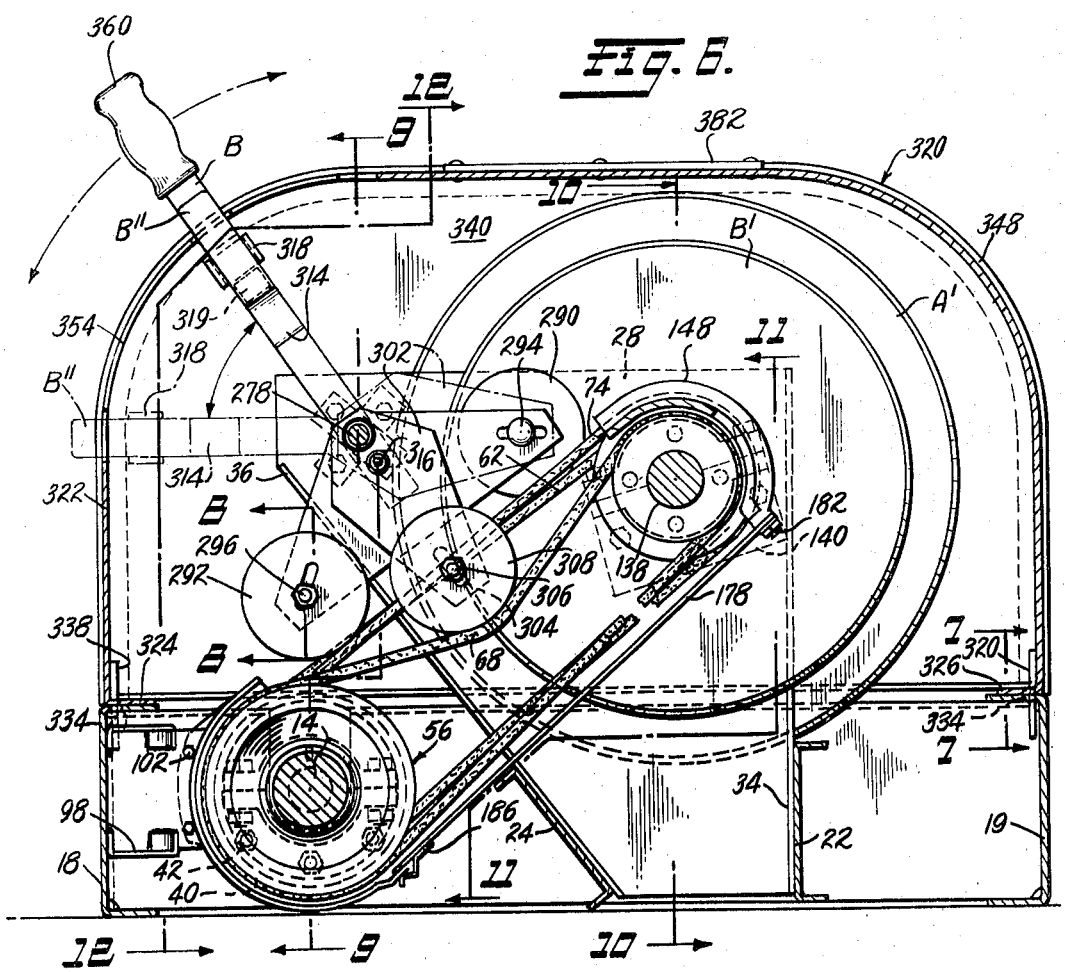
FIG. 6 is a transverse vertical sectional view, similar to FIG. 4, taken on the line 6—6 of FIG. 2.

Referring to FIG. 1 of the drawings, a known floor mounted type of chassis dynamometer is generally identified by the numeral 4 and comprises a main frame 5 rotatably supporting two pairs of aligned rolls 6 and 7. Ramps 8 are arranged along the opposite sides of the main frame 5 to enable a vehicle to be driven on and off the rolls 6 and 7. The rolls 7 are interconnected by a shaft 9 having a coupling 10, which can be disconnected to allow the rolls 7 to rotate relative to each other, as during a brake test. A power absorption unit 11 is connected to one of the rolls 7 by a coupling 12 for absorbing power transmitted to the rolls 7 from a pair of vehicle wheels (not shown) during a vehicle engine test, as is well understood in the art.

The variable inertia flywheel assembly of the present invention is generally identified by the numeral 13 and is shown positioned at the right end of the dynamometer frame 5. The assembly 13 is suitably aligned and anchored with respect to the dynamometer 4 and includes a main shaft 14 that is connected to the right hand roll 7 by a coupling 15.

Referring to FIG. 2, the assembly 13 includes a frame 16 comprising parallel channel-shaped side members 18 and 19, which are welded at their ends to transverse channel members 20 and 21. The channel members 20, 21 are further connected together by intermediate channel members 22 and 24, which are welded at their ends to the channel members 20,21. The channel member 22 is disposed with its main web vertical, as is shown in FIGS. 4 and 5, and the channel member 24 has its main web inclined on an angle of about 45°.

The channel members 22 and 24 are interconnected by upright, generally triangular brackets 26, 28, 30, and 32. Each of these brackets has a vertical flange 34 that is welded to the channel member 22, and an inclined flange 36 that is welded to the channel member 24. The brackets 26 and 28 are located at the opposite ends of the members 22 and 24, and adjacent to, but within the transverse channel members 20 and 21. The brackets 28 and 30 are located at intermediate points along the members 22 and 24 for a purpose that will be apparent hereinafter.

Referring to FIG. 9, the main shaft 14 has reduced ends 38 that are mounted in bearings 40 secured to the transverse frame members 20 and 21 by cap screws 42. The frame members 20 and 21 are recessed at 43 to receive the shaft ends 38. A stepped sheave 44 is secured to the shaft 14 near one end thereof by a key 46. The sheave 44 has a cylindrical portion 45 provided with three grooves 48 to receive three V-belts 50. The sheave 44 also has a relatively larger diameter cylindrical portion 51 provided with four grooves 52 to receive four V-belts 54.

A second stepped sheave 56 is secured to the mid portion of the shaft 14 by a key 58 and has a central region 59 of reduced diameter provided with two grooves 60 to receive a pair of V-belts 62. The sheave 56 has a flared portion 64 of larger diameter than said central region 59 provided with two grooves 66 to receive a second pair of V-belts 68. The sheave 56 has a second flared portion 70 of slighly smaller outside diameter than the flared portion 64, provided with two grooves 72 to receive a third pair of V-belts 74.

Located near the opposite end of the shaft 14 is a third stepped sheave 76 secured to the shaft 14 by a key 78. The sheave 76 has a cylindrical portion 80 provided with two grooves 82 to receive two V-belts 84, and has a cylindrical portion 86 of slightly larger diameter provided with four grooves 88 to receive four V-belts 90. The grooved sheave portions 51, 64, and 86 are equal in outside diameter; whereas, the grooved sheave portions 45, 59, 70, and 80 are of smaller and unequal outside diameters. The purpose of the sheaves 44, 56, and 76 and thir associated V-belts is to drive three steel flywheels, A', B', and C', having different mass and inertia properties, as will be pointed out later.

Referring to FIG. 2, a lower belt guard 92 has a base portion that is fastened to the transverse frame member 21 by a pair of cap screws 94, and a generally semicylindrical portion 96 that is concentric with the lower half of the sheave 44 and encloses the lower portion of the belts 50 and 54. A bracket 98 is welded to the front frame member 18 and has a lower belt guard 100 secured thereto by cap screws 102. The guard 100 has a semi-cylindrical portion 104 of varied diameters conforming with the different diameters of the central and flared portions 64 and 70 of the sheave 56, so as to closely enclose the lower portion of the belts 62, 68 and 74. A third lower guard 106 has a base portion 108 that is secured to the end frame member 20 by cap screws 110. The guard 106 has a semicircular cylindrical portion 112 of varying diameter to conform with the contour of the cylindrical portions 80 and 86 of the sheave 76 to enclose the lower portions of the belts 84 and 90.

Figure 10:
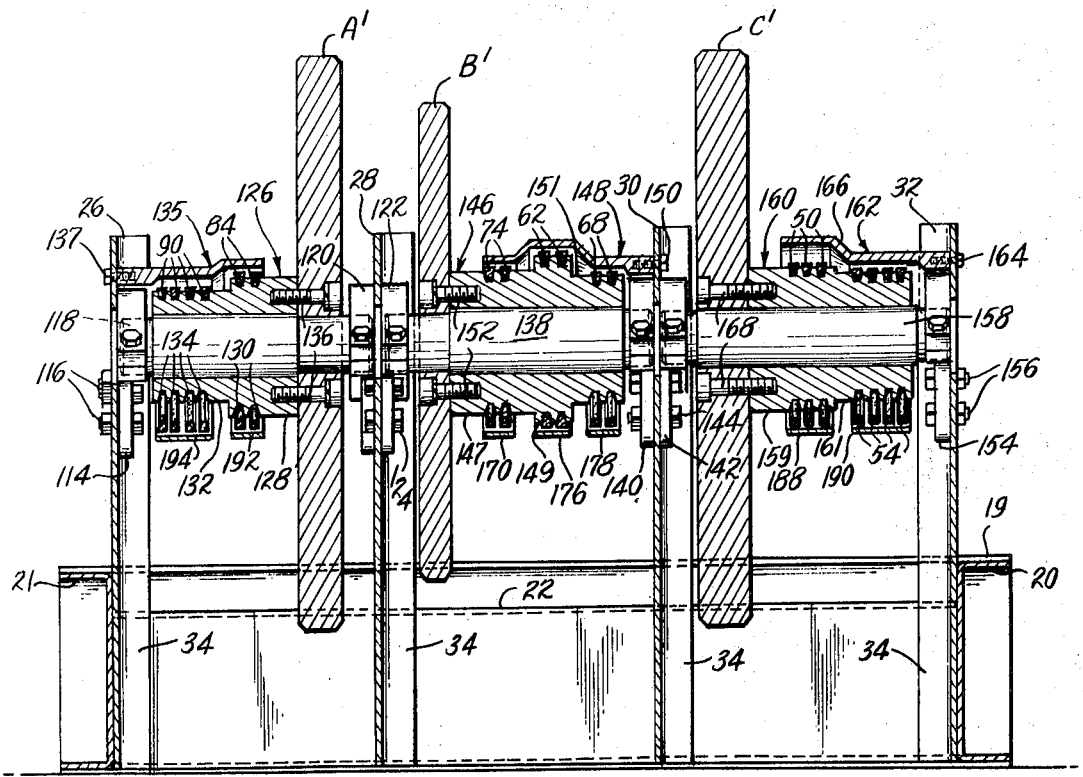
FIG. 10 is a vertical sectional view, taken on the line 10—10 of FIG. 6, showing the three flywheels and their individual sheave assemblies.

Referring to FIG. 10, a ball bearing 114 is secured to the bracket 26 by bolts 116 and supports one end of a shaft section 118. Ball bearings 120 and 122 are secured to opposite sides of the bracket 28 by bolts 124. The bearing 120 supports the other end of the shaft 118. A stepped sheave 126 is shrunk on to the shaft 118 and has a cylindrical portion 128 provided with two grooves 130 to receive the belts 84, and a relatively smaller diameter cylindrical portion 132 provided with four grooves 134 to receive the belts 90. A complementary upper belt guard 135 is mounted on the bracket 26 by cap screws 137 to enclose the upper portions of belts 84 and 90. The flywheel A' is about 21.5 inches in diameter and about 1.572 inches thick and is connected to the sheave 126 by four cap screws 136.

An intermediate shaft section 138 has one end thereof mounted in the bearing 122 and its other end mounted in a bearing 140. The bearing 140 and a bearing 142 are secured to opposite sides of the bracket 30 by bolts 144. A stepped sheave 146 has three cylindrical portions 147, 149 and 151 with sets of two grooves in each, to receive the pairs of belts 68, 62, and 74, respectively. A complementary upper guard 148 is secured to the bracket 30 by cap screws 150 to enclose the upper portions of the belts 68, 62 and 74. The flywheel B' is about 18 inches in diameter and about 1.069 inches thick and is secured to the sheave 146 by four cap screws 152.

A bearing 154 is secured to the inner side of the bracket 32 by bolts 156 and supports one end of a third shaft section 158, the other end of which is mounted in the bearing 142. A stepped sheave 160 is shrunk on to the shaft 158 and has portions 159 and 161 of different diameters grooved to receive the belts 50 and 54. An upper belt guard 162 is secured to the bracket 32 by cap screws 164 and includes a semi-cylindrical portion 166 contoured to enclose the upper portions of the belts 50 and 54. The flywheel C' is about 21.5 inches in diameter and about 1.964 inches thick and is secured to the sheave 160 by cap screws 168. The portions of the flywheel sheaves 132, 151 and 161 receiving the sets of belts 90, 68 and 54 are the same diameter; whereas, the portions 128, 147, 149 and 159 receiving the sets of belts 84, 74, 62 and 50 are all of larger and different diameters.

Figure 11:
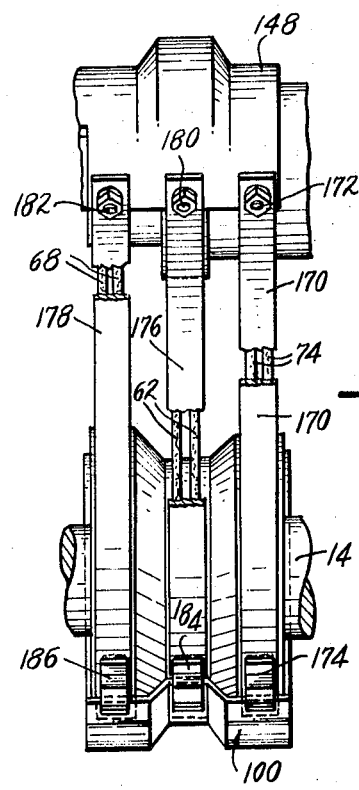
FIG. 11 is a staggered rear elevational view, taken on the line 11—11 of FIG. 6, showing the arrangement of the belt guards for one of the drive sheave and flywheel sheave assemblies.

Referring to FIG. 11, a belt support bar 170 is secured to the upper belt guard 148 by a stud bolt 172. A spring clip 174 is welded to the lower end of the support bar 170 and engages an edge of the lower belt guard 100 to thereby shield the lower run of the pair of belts 74. Similar belt support bars 176 and 178 are secured to the upper belt guard 148 by bolts 180 and 182, respectively, and to the lower belt guard 100 by spring clips 184 and 186, respectively, to shield the belts 62 and 68, respectively.

Belt support bars 188 and 190 extend between the upper belt guard 162 and the lower belt guard 96 to shield the lower run of the belts 50 and 54, respectively. Like belt support bars 192 and 194 extend between the upper belt guard 135 and the lower belt guard 106 to shield the lower run of the two sets of belts 84 and 90, respectively.

As will be apparent from the foregoing, it is intended that the main shaft 14 drive the respective flywheels A', B', and C', through the various sheaves and sets of belts associated therewith at a predetermined speed ratio relative to the speed of the main shaft. The specific ratios will be pointed out later. In order to effect such drive ratios it is necessary to tension the various sets of belts to impart a drive from a sheave on the main shaft 14 to a sheave connected with a particular flywheel. The means whereby this is accomplished will now be described.

Referring to FIG. 9, a shaft section 196 has reduced diameter ends that are rotatably mounted in plain bearings 198 and 200, respectively secured by bolts 202 and 204 to brackets 26 and 28, respectively. A shifter assembly 206 comprises a shift plate 208 welded to a hub 210 secured by a pin 212 to the shaft section 196. Referring to FIG. 5, it will be seen that the shift plate 208 is generally triangular and has slots 214 and 216 arranged on a radius relative to the axis of the shaft section 196. An idler 218 is secured to the shift plate 208 by a carriage bolt 220. A similar idler 222 is secured to the shift plate 208 by a carriage bolt 224 adjustably mounted in the slot 216. The mounting means for idlers 218 and 222, is the same and applies to all other idlers and mounting means therefore disclosed herein.

Figure 8:
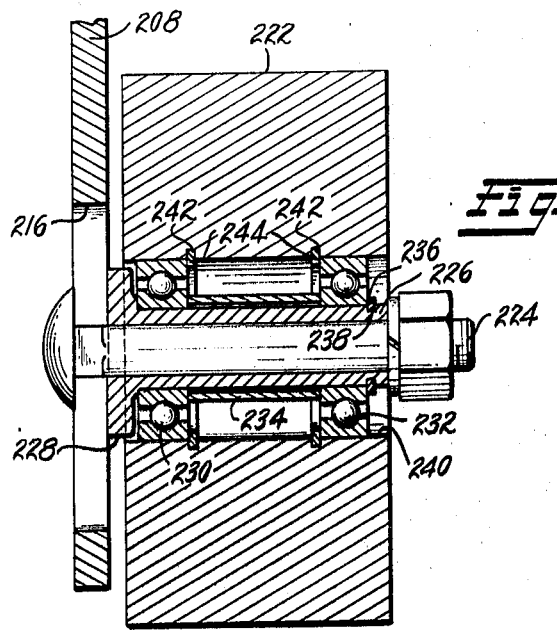
FIG. 8 is an enlarged fragmentary vertical sectional view, taken on the line 8—8 of FIG. 6, showing the mounting means for one of the idler pulleys.

By way of specific example, reference is made to FIG. 8 wherein the idler 222 and its carriage bolt 224 are illustrated in further detail. Thus, it will be seen that a sleeve 226 is mounted on the bolt 224 and has an enlarged head 228 that is engaged with the adjacent side of the shift plate 208. Two ball bearings 230 and 232 are mounted on the sleeve 226 with a spacer 234 therebetween. The sleeve 226, ball bearings 230 and 232, and the spacer 234 are maintained in assembled relation by a snap ring 236 set in a groove 238 in the sleeve. The idler 222 has an axial bore 240 provided with two grooves 242 each of which receives a snap ring 244, one of which is disposed adjacent each of the ball bearings 230 and 232 to prevent the idler 222 from moving axially with respect to the carriage bolt 224.

Reverting to FIG. 9, the shift plate 208 has an opening 246 to receive a shouldered bolt 248. The bolt 248 is threaded in an opening 249 (FIG. 3), at the lower end of a lever A and a compression spring 252 is disposed between the head of the bolt 248 and the adjacent side of the shift plate 208 and tends to pull the lower end of the lever A toward the shift plate 208. The lever A has an opening 254 (FIG. 9), to receive the shaft section 196, which serves as a pivot for the lever A. The bolt 248 is located below the shaft section 196 so that upon pivotal movement of the lever A, relative to the shaft section 196, the shift plate 208 will be rocked in one direction or another depending upon the direction in which the lever A is moved.

Figure 12:
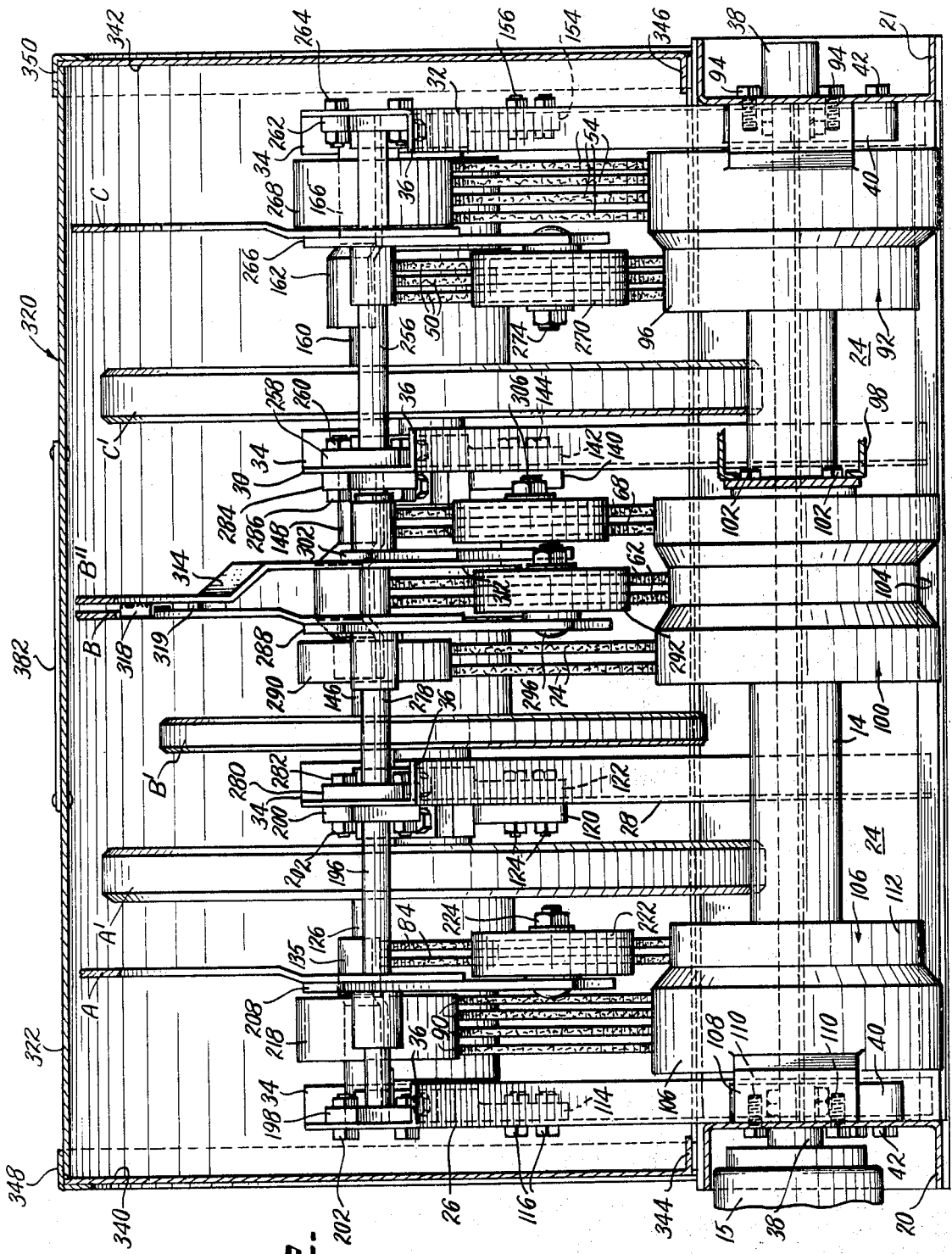
FIG. 12 is a vertical sectional view, taken on the line 12—12 of FIG. 6, particularly showing the various sets of belts, levers, shift plates and idlers.

It will be noted from FIGS. 2, 9 and 12 that the idlers 218 and 222 are located upon opposite sides of the shift plate 208, and that the plate is located in a vertical plane between the two sets of belts 84 and 90. Consequently, the idler 218 is adapted to be engaged with the four belts 90 and the idler 222 is engagable with the two belts 89. The lever A is illustrated in FIG. 5 in a neutral position. That is, one wherein neither of the idlers 218 nor 222 is engaged with or exerts any pressure on its associated belts. Therefor, no drive will be transmitted from the sheave 76 on the main shaft 12 to the sheave 126 to drive the flywheel A'. The manner in which the lever A is actuated to selectively effect driving of the flywheel A' through either of the sets of belts 84 and 90 will be described later.

Referring to FIG. 9, a shaft section 256 has reduced ends, one of which is mounted in a bearing 258 secured by bolts 260 to the bracket 30, and the other of which is mounted in a bearing 262 secured by bolts 264 to the bracket 32. A shift plate 266 is mounted upon the shaft section 256 in the same manner as the shift plate 208. The shift plate 266 has idlers 268 and 270 adjustably mounted thereon by carriage bolts 272 and 274, respectively. A lever C is pivotally mounted upon the shaft section 256 in the same manner as the lever A and its lower end is likewise connected by a spring pressed bolt 277 and urged toward shift plate 266. Here again, the idlers 268 and 270 are disposed on opposite sides of the shift plate 266, as is best shown on FIGS. 2 and 12. The idler 268 is engagable with the four belts 54 and the idler 270 is engagable with the three belts 50 to effect driving of the flywheel C' upon actuation of the lever C in a manner to be described later.

Still referring to FIG. 9, an intermediate section 278 has reduced ends, one of which is mounted in a bearing 280 secured to the bracket 28 by bolts 282, and the other end of which is supported in a bearing 284 secured to the bracket 30 by bolts 286. A shift plate 288, similar to the shift plates 208 and 266 is fixed to the shaft section 278. The shift plate 288 has idlers 290 and 292 mounted thereon by carriage bolts 294 and 296, respectively. A lever B is pivotally mounted upon the shaft section 278 in the same manner as the levers A and C, and is similarly secured to the shift plate 288 by a spring pressed bolt 300. The idler 290 assumes a position to engage with a pair of belts 74 and the idler 292 for engagement with the pair of belts 62. The manner in which the lever B is operated to tension these belts will be described later.

Referring again to FIG. 9, shift plate 302 is fixed to the shaft ection 278 and has a configuration different from that of the shift plates previously described. Thus, referring to FIG. 6, the shift plate 302 tapers toward its lower end and has a radial slot 304 to receive a carriage bolt 306 for mounting an idler 308 thereon. An auxiliary lever B'' has a lower end 312 that is rotatably mounted on the shaft 278. The lever B'' includes an offset portion 314, whereby the upper end of the lever is disposed adjacent the lever B and its lower end 312 is disposed adjacent the shift plate 302. A spring-pressed bolt 316 urges the lower end 312 of the lever B'' toward the shift plate 302. As is best shown in FIGS. 2 and 12, the idler 308 is adapted to tension the pair of belts 68.

The lever B'' has a channel piece 318 welded thereto in a manner to straddle the lever B, whereby the levers B and B'' can be simultaneously shifted. Since the auxiliary lever B'' is tiltable laterally away from the lever B, it can be released from and shifted independently of the lever B. A spacer block 319, which is welded to lever B'', keeps it spaced from the lever B so that it can be readily grasped and tilted sidewise for movement independently of the lever B. The manner in which the levers B and B'' can be manipulated to drive the flywheel B' will be explained in detail later.

Figure 7:
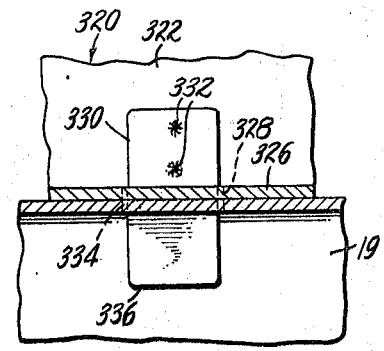
FIG. 7 is an enlarged fragmentary vertical sectional view, taken on the line 7—7 of FIG. 6, showing one of the stops for mounting the cover on the flywheel frame.

The above described flywheels, belts, shift plates, etc., are enclosed by a cover 320 comprising a generally U-shaped panel 322 having its ends bent inwardly to provide flanges 324 and 326, which rest upon the front and rear frame members 18 and 19, respectively, FIG. 7. The flanged portion 326 has a rectangular opening 328 formed therein to receive a retaining member 330 spot welded thereto as indicated at 332. The horizontal flange of the frame member 19 has a similar opening 334 formed therein to receive a projecting portion 336 of the retainer 330. A similar retainer 338 extends through an opening 334 in the flange 324 and the upper web of the front frame member 18, as shown in FIG. 6. In this manner, the cover 320 is properly aligned and retained on the frame assembly 16.

The cover 320 further comprises side members 340 and 342, also provided with inwardly bent flanges 344 and 346, respectively, which rest upon the upper flanges of the front and rear frame members 18 and 19. The end wall 340 has an angle-shaped molding strip 348 welded thereto with the horizontal portion of the strip overlapping and being welded to the adjacent edge of the cover panel 322, to thus permanently secure the end wall 340 in position. The end wall 342 is similarly permanently connected with the panel 322 by an angle-shaped strip 350.

As is best shown in FIG. 1, the cover 320 has a slot 352 to receive the lever A; a relatively wider slot 354 to receive the levers B and B''; and a third slot 356 to receive the lever C. A removable plastic handle 358 is mounted on the lever A and similar plastic handles 360 and 362 are mounted upon the levers B and C, respectively. The lever B'' is shorter than the lever B and does not have a plastic handle, but does project outwardly beyond the slot 354, as shown in FIG. 6.

Figure 13:
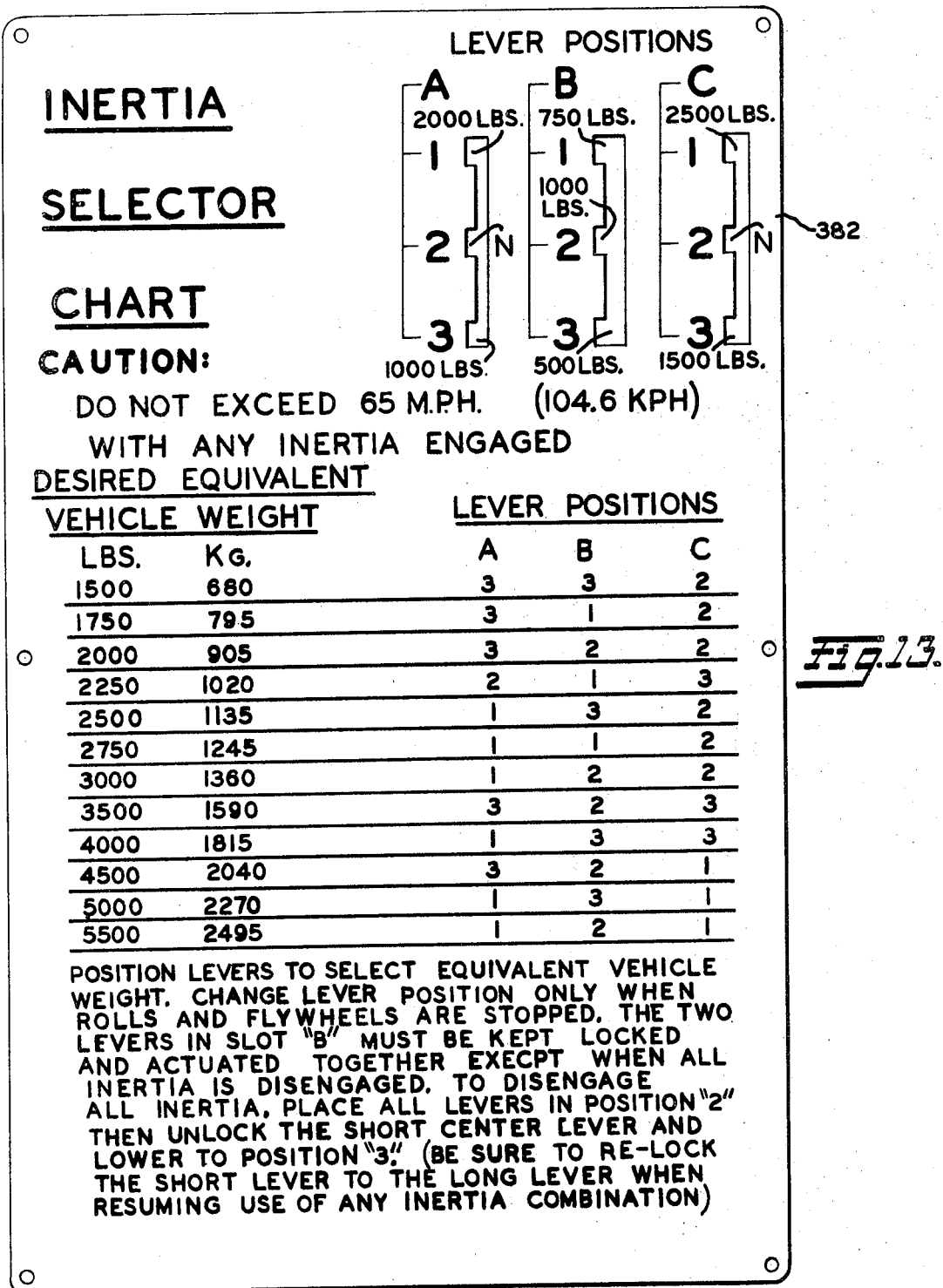
FIG. 13 is an enlarged view of the instruction plate mounted on the cover in FIG. 1, showing an INERTIA SELECTOR CHART including a tabulation of the position that the three shift levers must occupy to produce a total simulated inertia load equivalent to a given vehicle weight.

The left edge of each slot 352, 354, and 356 has three notches to indicate lever positions Nos. 1, 2 and 3, the notches 1 and 3 being located at the extremities of the slots and the notches 2 being located at the intermediate portion of the slots, as is shown in better detail on the INERTIA SELECTOR CHART, FIG. 13. The No. 2 position of the slots is the "N" or neutral position for the levers A and C.

In order to mount or remove the cover 320, the plastic handles 358, 360 and 362 are removed from their associated levers, A, B and C. The upper ends of the levers are placed in registration with their intended slots and the cover 320 is then lowered. The design of the cover 320 is such that the cover must be shifted toward the right a short distance in order to place the retainers 330 and 338 in the openings 334 in the front and rear frame members 18 and 19. Such sidewise shifting of the cover 320 compresses the spring on the bolts 248, 300 and 277 at the lower end of the levers A, B and C, respectively, so that the levers are urged laterally for retention in any one of the particular notches in which it is desired to position the same. The lever B'' is held in alignment with the lever B by the channel piece 318, augmented by the spring on bolt 316. This assures against all inadvertant movement of the levers.

It is to be understood that the flywheels A', B' and C' are designed specially for use with dynamometer rolls of a particular size, and for rotation at predetermined speed ratios relative to the roll speed. The roll speed, in turn, is related to vehicle speed since the rolls will make a given number of revolutions per mile relative to the vehicle wheels driving the same. As a specific example, and not by way of limitation, the dynamometer rolls 6 and 7 are 8⅝ inches, outside diameter and will make 2,338 revolutions per vehicle mile. At a vehicle speed of 60 mph the rolls would make 2,338 rpm. Since the main shaft 14 is connected for direct drive by the dynamometer roll 7, the sheaves 44, 56 and 76 mounted thereon will rotate at the same speed as the roll 7.

FIG. 13 illustrates an INERTIA SELECTOR CHART with instructions for operation of the levers A, B and C to simulate various vehicle weight inertia loads. This chart may be in the form of a metal plate 382, conveniently attached to the cover 320 in the position indicated in FIG. 1. For illustrative purposes, the inertia values have been applied to the respective notches or lever positions, but these are not required in practice since the operator positions the levers A, B and C for a given weight vehicle in accordance with the lever positions indicated on the chart, under the legend LEVER POSITIONS. In this connection, the levers can be quickly adjusted for successive vehicles of different weight, and this is important in installations where rapid handling of vehicles is necessary.

In the chart, the first column lists the DESIRED EQUIVALENT VEHICLE WEIGHT in LBS. The second column lists the same vehicle weights in KG. Further self-explanatory operating instructions appear at the bottom of the chart.

Reverting to the matter of system design, and by way of further example, and not by way of limitation, the sheaves 76, 56 and 44 on the main drive shaft 14 drive the flywheel sheaves 126, 146 and 160, respectively, at definite speed ratios. Thus, stepped sheave 76 drives the sheave 126 of flywheel A' at the rpm ratio of 1 to 2.0000 (lever A in position No. 1 tensioning belts 90) and 1 to 1.4142 (lever A in position No. 3 tensioning belts 84); stepped sheave 56 drives the sheave 146 of the flywheel B' at the rpm ratios of 1 to 1.5853 (lever B in No. 1 position tensioning belts 74), 1 to 1.0111 (lever B in No. 3 position tensioning belts 62), and 1 to 2.0000 (lever B'' in No. 2 position tensioning belts 68); and stepped sheave 44 drives flywheel sheave 160 at the rpm ratios of 1 to 2.0000 (lever C in No. 1 position tensioning belts 54), and 1 to 1.5491 (lever C in No. 3 position tensioning belts 50). Thus, the flywheels A', B' and C' are all driven at a speed higher than that of the main shaft 14, except when lever B is in its No. 3 position at which time the flywheel B' and the shaft 14 rotate at substantially the same speed.

The three flywheels A', B' and C', driven by the various sets of V-belts, engagable in various positions of the levers A, B–B'', and C, as described above, produce the 12 increment combinations required to accomodate the desired range of inertia load variations. The necessary drive ratios are obtained by operating the levers A, B–B'', or C to move the shift plates 208, 288, 302, and 266, to cause the idlers carried thereby to tension the set or sets of belts to effect driving of the flywheels A', B' and/or C' from the main shaft 14 at the required speed. In the operation of the device, the levers A, B—B'', and C should not be operated to engage any of the flywheels A', B' or C', or change the inertia ratios when the flywheels or dynamometer rolls 6, 7 are rotating. In the interest of safety, the flywheels A', B' and C' and rolls 6, 7 must be stopped before any operation of the levers A, B–B'' and C takes place.

The flywheel B', whose main control lever B and auxiliary control lever B'' extend through the relatively wider center slot 354, is the basic flywheel, and is driven from the sheave 56 on drive shaft 14 by the three sets of belts 62, 68 and 74, at any one of three selected speed ratios, as noted above. The flywheel B' is designed to compensate for the 350 pound inertia load of the rotating elements of the chassis dynamometer, such as the rolls, and power absorber unit, as well as the flywheel drive belts and sheaves, in all three positions of the levers b–B''. It is to be understood that the flywheel B' is normally driven continuously, alone, at one speed or another, or along with either flywheels A' or C', or both. With the lever B in the notch corresponding to its No. 1 position, the shift plate 288 engages the idler 290 with the belts 74 and drives the flywheel B' so that the total of the inertia of the chassis dynamometer, etc., will simulate the equivalent inertia of a 750 pound vehicle (see FIG. 13). With the lever B in its No. 2 position, neither of the idlers 290 nor 292 will be engaged with the belts 74, and 62, but the shift plate 302 carried by the lever B'' will engage the idler 308 with the belts 68 and tension the same so that the flywheel B' will be driven to simulate the equivalent inertia of a 1,000 pound vehicle. When the lever B is moved to its No. 3 position, the idler 292 carried by the shift plate 288 will tension the belts 62 and drive the flywheel B' to simulate the equivalent inertia of a 500 pound vehicle. The levers B and B'' will occupy the same radial position, normally locked together by the channel member 318, except when a no-inertia effect is desired, as will now be explained.

In order to disengage all inertia from the flywheel B', the lever B is placed in its No. 2 position, and the auxiliary lever B'' is rocked to the right to disengage it from the lever B, and then moved to its No. 3 position. However, at this time, the lever A must be in its No. 2 or neutral notch, and the lever C must be likewise engaged with its No. 2 or neutral notch. With this positioning of the several levers, their associated shift plates will position the idlers carried thereby so that none of the belts is under tension and none of the flywheels is driven. When it is desired to resume operation with any inertia combination, the short lever B'' is released from its No. 3 position and positioned so that it is reengaged with the main lever B.

In order to obtain an inertia effect with the flywheel A', the lever A is placed in either its No. 1 or No. 3 notch (see FIG. 13). With the lever A engaged in the No. 1 notch, the idler 218 carried by shift plate 208 will tension the belts 90 and drive the flywheel A' to simulate the added inertia equivalent of a 2,000 pound vehicle. With the lever A engaged in its No. 2 notch, a neutral condition will exist wherein neither of the idlers 218 nor 222 tensions its associated belts, so that the flywheel A' will remain stationary. Upon shifting the lever A into No. 3 notch, the shift plate 208 will position the idler 222 to tension the belts 84 to drive the flywheel A' to simulate the added inertia equivalent of a 1,000 pound vehicle.

The flywheel C' is controlled by the lever C. When this lever is positioned in its No. 1 notch, the shift plate 266 will be actuated so that the idler 268 tensions the belts 54 to drive the flywheel C' to simulate the added inertia equivalent of a 2,500 pound vehicle. In FIG. 4, the lever C is shown in its No. 2 notch, which positions the shift plate 266 in neutral so that no tension is exerted on either of the sets of belts 50 or 54 by the idlers 270 and 268. Movement of the lever C into engagement with its No. 3 notch will shift the plate 266 and cause the idler 270 to tension the belts 50 to drive the flywheel C' at a speed to simulate the added inertia equivalent of a 1,500 pound vehicle.

In using the present apparatus, and assuming that a vehicle weighing 1,600 pounds is to be tested for exhaust gas emission, simulation of the inertia of a 1,500 pound vehicle would be suitable.

According to the INERTIA SELECTOR CHART, FIG. 13, lever A would be placed in its No. 3 position to produce a 1,000 pound load, and the lever B would be placed in its No. 3 position to produce a 500 pound load. The lever C would be placed in its No. 2, or neutral position, so that the total inertia load available through flywheels A' and B' would then be 1,000 plus 500 or 1,500 pounds. However, it will be understood that the inertia load produced by these flywheels will increase or decrease in accordance with the vehicle or dynamometer roll speed, and that the vehicle inertia will be continually matched by the flywheel inertia.

Should the next vehicle to be tested be heavier, the levers A, B or C can be quickly readjusted, following the directions on the INERTIA SELECTOR CHART, to provide an inertia load nearest to the weight of such vehicle. It will be readily understood from the foregoing, when considered in conjunction with the INERTIA SELECTOR CHART that the inertia load corresponding to any vehicle weight from 1,500 to 5,500 pounds can be closely simulated by properly adjusting the levers A, B, and C.

It will be understood that the dimensions of the flywheels A′, B′ and C′, and the main shaft to flywheel drive ratios described herein are applicable only to dynamometer rolls 8⅝ inches in diameter, and that the flywheel dimensions and drive ratios specified will be different for different sized rolls.

It will be further understood that various changes may be made in the dimensions and details of construction of the present apparatus without departing from the principles of the invention or the scope of the appended claims.

I claim:

1. Variable inertia flywheel apparatus for use with a chassis dynamometer, particularly during exhaust gas emission measurements, to provide various inertia loads simulating the effect of the weight of the vehicle on engine performance during acceleration and deceleration of the vehicle while on said dynamometer, said dynamometer having rotating elements including rolls to be driven by the vehicle wheels, comprising: a main shaft rotatably supported to be driven from one of said dynamometer rolls; a flywheel rotatably supported to be directly driven from said main shaft, said flywheel means including a flywheel of predetermined size and mass; means between said main shaft and said flywheel operable to selectively drive said flywheel at different speed ratios relative to the speed of said main shaft, to provide inertia loads on the vehicle varying in accordance with the increase or decrease in speed of said main shaft, said drive means between said main shaft and said flywheel including a pulley connected for rotation with said flywheel; a pulley secured to said main shaft; each of said pulleys having three portions of different diameter and three separate drive belts, one extending loosely about each of said three pulley portions to drive said flywheel at three different speed ratios relative to said main shaft; and operating lever means for effecting driving of said flywheel from said drive shaft, said operating lever means being operable to selectively tension either of the three drive belts, and including a main and an auxiliary operating lever, means supporting said operating levers for pivotal movement about a common axis, a shift plate mounted upon said main operating lever and carrying two idlers, one for engaging and tensioning one of said drive belts and the other for engaging and tensioning a second of said drive belts, and a shift plate mounted on said auxiliary operating lever and carrying an idler for engaging and tensioning the third of said drive belts.

2. Apparatus as defined in claim 1, wherein the auxiliary operating lever has means releasably engageable with the main operating lever so that both levers can be moved simultaneously or independently.

3. Variable inertia flywheel apparatus for use with a chassis dynamometer, particularly during exhaust gas emission measurements, to provide various inertia loads simulating the effect of the weight of the vehicle on engine performance during acceleration and deceleration of the vehicle while on the dynamometer, said dynamometer having rotating elements including rolls to be driven by the vehicle wheels, comprising: a main shaft rotatably supported to be driven from one of said dynamometer rolls, said main shaft having a first sheave fixed thereto adjacent one end thereof, said sheave having two cylindrical portions of different diameter, each cylindrical portion being provided with a set of grooves to receive a first set of belts; a second sheave mounted upon said main shaft at approximately the midpoint thereof and having three cylindrical portions of different diameter, each provided with a set of grooves to receive a second set of belts; a third sheave fixed to said main shaft adjacent the opposite end thereof and having two cylindrical portions of different diameter, each provided with a set of grooves to receive a third set of belts; three flywheels of different mass; means rotatably supporting said flywheels on said frame for independent rotation relative to each other; means between said main shaft and said flywheels operable to selectively drive said flywheels at different speed ratios relative to the speed of said main shaft, to provide inertia loads on the vehicle varying in accordance with the increase or decrease in speed of said main shaft, said drive means comprising a first sheave connected with one of said flywheels and having two cylindrical portions of different diameter, each provided with a set of grooves to receive said first set of belts, a first set of belts extending around said first sheave on said one flywheel and said first sheave on said main drive shaft; a second sheave connected with the second flywheel and having three cylindrical portions of different diameter, each provided with a set of grooves to receive said second set of belts, a second set of belts extending around said second sheave on said second flywheel and said second sheave on said main drive shaft; and a third sheave connected with the third flywheel and having two cylindrical portions of different diameter, each grooved to receive said third set of belts, a third set of belts extending around said third sheave on said third flywheel and said third sheave on said main drive shaft; bracket means mounted upon said frame; shaft sections mounted upon said brackets; and levers and shift plates carrying idlers pivotally mounted upon said shaft sections arranged to be operable for selectively tensioning one or more of said sets of belts for effecting driving of one or more of said flywheels at a desired ratio relative to the speed of said main drive shaft.

4. Variable inertia flywheel apparatus for use with a chassis dynamometer, particularly during exhaust emission measurements, to provide various inertia loads simulating the effect of the weight of the vehicle on engine performance during acceleration and deceleration of the vehicle while on the dynamometer, said dynamometer having rotating elements including rolls to be driven by the vehicle wheels, comprising: a main shaft rotatably supported to be driven from one of said dynamometer rolls; a flywheel rotatably supported to be directly driven from said main shaft, said flywheel being of a predetermined size and mass; means between said main shaft and said flywheel operable to selectively drive said flywheel at different speed ratios relative to the speed of said main shaft, to provide inertia loads on the vehicle varying in accordance with the increase or decrease in speed of said main shaft, said drive means between said main shaft and said flywheel including a pulley connected for rotation with the flywheel; a pulley secured to the main shaft; a drive belt extending loosely around both pulleys; operating lever means; means pivotally supporting said operating lever means; and idler means actuated by said operating lever means to engage with and tension said drive belt to effect driving of said flywheel from said main shaft, said operating lever means being laterally movable relative to said shift plate; and a spring-pressed bolt movably mounting the lower end of said operating lever means on said shift plate and urging the lower end of said operating lever means toward said shift plate.

5. Apparatus as defined in claim 4, wherein the main shaft and flywheel are rotatably mounted upon a frame; and the apparatus includes additionally: a cover mounted upon said frame and enclosing the main shaft, flywheel, and drive belt, and wherein the cover has slot means through which the operating lever means extends, and wherein the slot means has notches formed in a side wall thereof for receiving and retaining the operating levers means in selected position.

6. Apparatus as defined in claim 5, wherein the cover, frame, and mounting means for the operating lever means are designed so that when the cover is in correct position the operating levers are yieldably urged toward the notched side of the slot means.

7. Variable inertia flywheel apparatus, comprising: a frame; a main shaft rotatably mounted upon said frame and having a plurality of stepped sheaves mounted thereon; a plurality of flywheels; means mounting said flywheels on said frame for rotation independently of each other; a stepped sheave connected with each flywheel, said stepped sheaves on said main shaft and those connected with said flywheels each having two sets of grooves to receive two sets of belts; belts loosely mounted in the grooves in said stepped sheaves to interconnect the same when tensioned; an operating lever for controlling each flywheel; a shift plate connected with each operating lever; means pivotally supporting said operating levers and shift plates for movement about a common axis; a pair of idlers carried by each shift plate with the idlers on each shift plate arranged to be engagable with a different one of the sets of belts of the interconnected sheaves, said operating levers each having a first position in which one of the idlers associated therewith is actuated to tension one set of belts; a second or neutral position; and a third position in which the other idler is actuated to tension the other set of belts, whereby the flywheels are driven from the main shaft at a relative speed ratio corresponding to the selected positions of the operating levers.

* * * * *